G. R. GATES.
STEERING GEAR.
APPLICATION FILED OCT. 4, 1913.
1,111,534.
Patented Sept. 22, 1914.
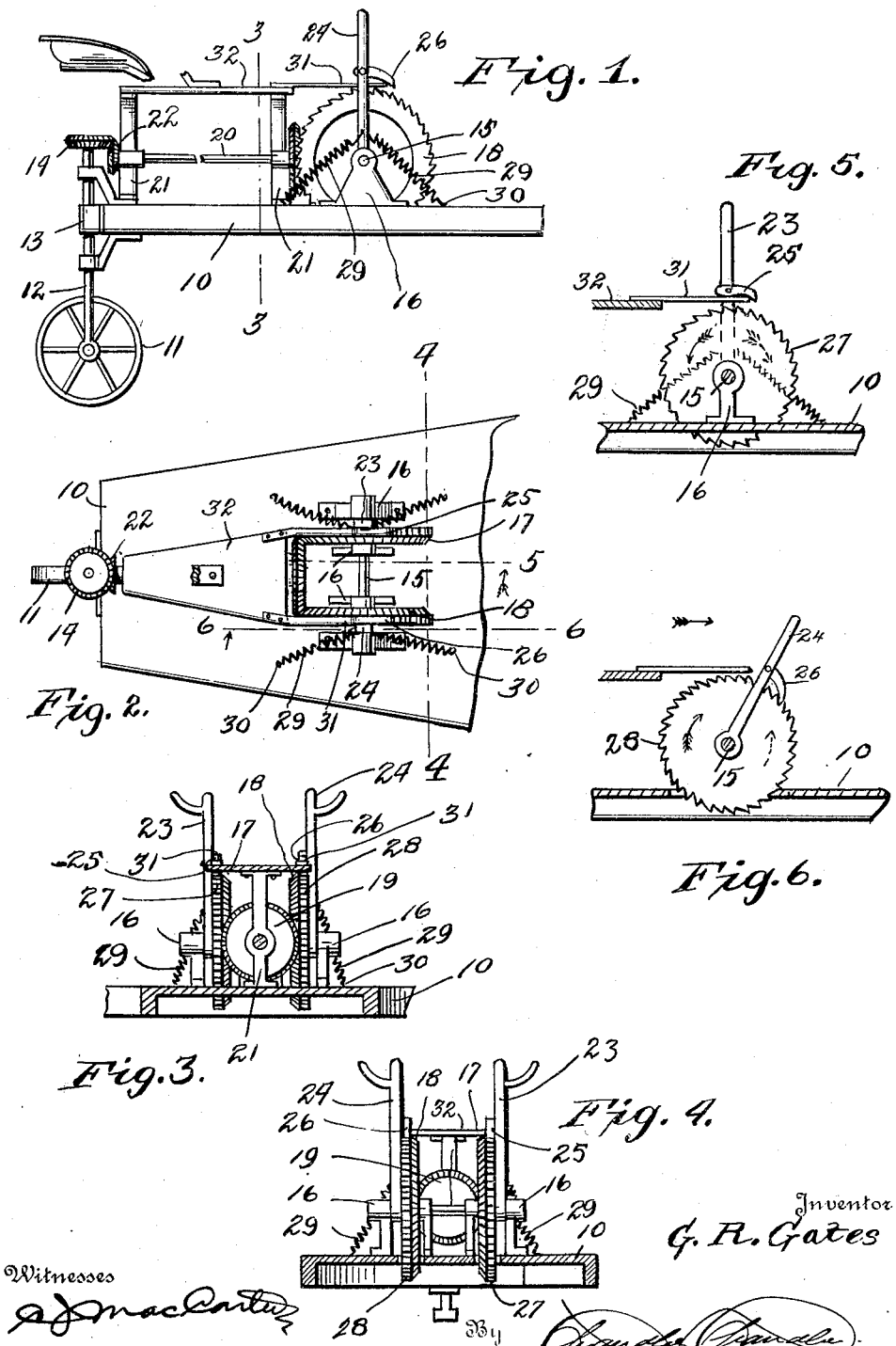

UNITED STATES PATENT OFFICE.

GEORGE R. GATES, OF BELOIT, KANSAS.

STEERING-GEAR.

1,111,534.  Specification of Letters Patent. Patented Sept. 22, 1914.

Application filed October 4, 1913. Serial No. 793,441.

*To all whom it may concern:*

Be it known that I, GEORGE R. GATES, a citizen of the United States, residing at Beloit, in the county of Mitchell, State of Kansas, have invented certain new and useful Improvements in Steering-Gears; and I do hereby declare the following to be a full, clear, and exact description of the invention, such as will enable others skilled in the art to which it appertains to make and use the same.

This invention relates to steering gears, and has for an object to provide a steering gear that may be operated through the instrumentality of foot pedals.

A further object of the invention is to provide a steering mechanism including oppositely movable ratchet operated gears which have operative connections with the dirigible ground wheel of a vehicle.

A still further object is to provide a device of this character that may be inexpensively constructed and will be devoid of complicated parts.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a side elevation of a fragmentary portion of a vehicle equipped with my improved steering gear. Fig. 2 is a plan view. Fig. 3 is a cross section on the line 3—3 Fig. 1. Fig. 4 is a cross section on the line 4—4 Fig. 3. Fig. 5 is a cross sectional view on the line 5—5 Fig. 2. Fig. 6 is a cross sectional view on the line 6—6 Fig. 2.

Referring now to the drawing in which like characters of reference designate similar parts, 10 designates the frame of a vehicle, and 11 the dirigible ground wheel thereof, the same being carried on a standard 12 that is journaled in a bearing 13 on the frame, the standard being equipped at the upper end with a bevel gear 14.

In carrying out my invention, a shaft 15 is journaled transversely of the frame in bearings 16 carried by the frame, there being spaced opposing bevel gears 17 and 18 loose upon this shaft, and there being a bevel pinion 19 meshing with both of these gears, such pinion being carried on a shaft 20 that is journaled longitudinally of the frame in bearings 21, and is equipped with a bevel gear 22 that meshes with the dirigible wheel bevel gear 14. Loose on the shaft are foot pedals 23 and 24 that have gravity pawls 25 and 26 which mesh with ratchet teeth 27 and 28 on the respective gears 17 and 18. Each pedal is normally held upright by means of opposed helical springs 29 that are attached to the frame as shown at 30. Each pawl is normally held released when the related lever is in upright position by means of a horizontal release pin 31 that is carried on a support 32 of any suitable character, these release pins passing underneath the free ends of the pawls when the pedals return to upright position and lift the pawls from engagement with their respective ratchet wheels, the springs 29 then serving to hold the pedals upright and prevent turning of the dirigible ground wheel.

In operation suppose that it is desired to swing the machine around a right turn. The operator pushes forwardly the right pedal 24 with his right foot whereby the right ratchet gear 18 is rotated forwardly with a resultant swinging of the dirigible wheel 11 to the left to swing the vehicle to the right, the left gear 17 meanwhile rotating rearwardly under its raised pawl as shown by the arrow heads in full lines in Figs. 5 and 6. To straighten out the machine after it has swung around a turn, the operator pushes the left pedal forwardly with his left foot whereby the left gear 17 is rotated forwardly with a resultant swinging of the dirigible wheel to the right, the right gear 18 meanwhile rotating rearwardly under its raised pawl 26, these positions being shown by arrow heads in dotted lines in Figs. 5 and 6. To swing the vehicle around a left turn the operation above described for swinging the vehicle around a right turn in reversed. Should the operator desire to turn a square corner, the pedal which he is operating may be pulled back and given a second stroke to facilitate sufficient swinging of the ground wheel to make the turn.

From the above description it will be seen that I have provided an extremely simple and inexpensive steering mechanism that is effective in operation and is devoid of complicated parts.

What is claimed, is:—

1. The combination with a dirigible ground wheel, of means for swinging the ground wheel to make a turn including a shaft, opposed bevel gears on said shaft having peripheral ratchet teeth, a bevel pinion meshing with both gears and having an operative connection with said ground wheel, a pair of foot pedals pivoted on said shaft, springs normally holding said pedals in upright position, and releasable gravity pawls on said pedals operatively engaging the ratchet teeth of said gears.

2. The combination with a dirigible ground wheel, of means for steering the ground wheel including a frame, a transverse shaft on said frame, opposed bevel gears on said shaft each having peripheral ratchet teeth, a bevel pinion meshing with both gears and having an operative connection with said ground wheel, a pair of foot pedals pivoted on said shaft, opposed springs for each pedal connected to said frame and normally holding the pedal upright, a gravity pawl on each pedal disposed in operative relation with the adjacent peripheral ratchet teeth, and stationary pins adapted to project underneath and raise both pawls when the pedals are in vertical position.

3. In combination with a dirigible ground wheel, means for steering the ground wheel comprising a frame, a transverse shaft in said frame, opposed bevel gears on said shaft each having peripheral ratchet teeth, a bevel pinion meshing with both gears and having an operative connection with said ground wheel, a pair of foot pedals revoluble upon said shaft, springs connected with each pedal for normally holding it upright, and a pawl on each pedal normally held out of engagement with said ratchet teeth and disposed to engage said ratchet teeth when said pedal is moved forwardly.

In testimony whereof, I affix my signature, in the presence of two witnesses.

GEORGE R. GATES.

Witnesses:
L. A. MERGEN,
T. P. DONNS.

Copies of this patent may be obtained for five cents each, by addressing the "Commissioner of Patents, Washington, D. C."